Patented May 8, 1923.

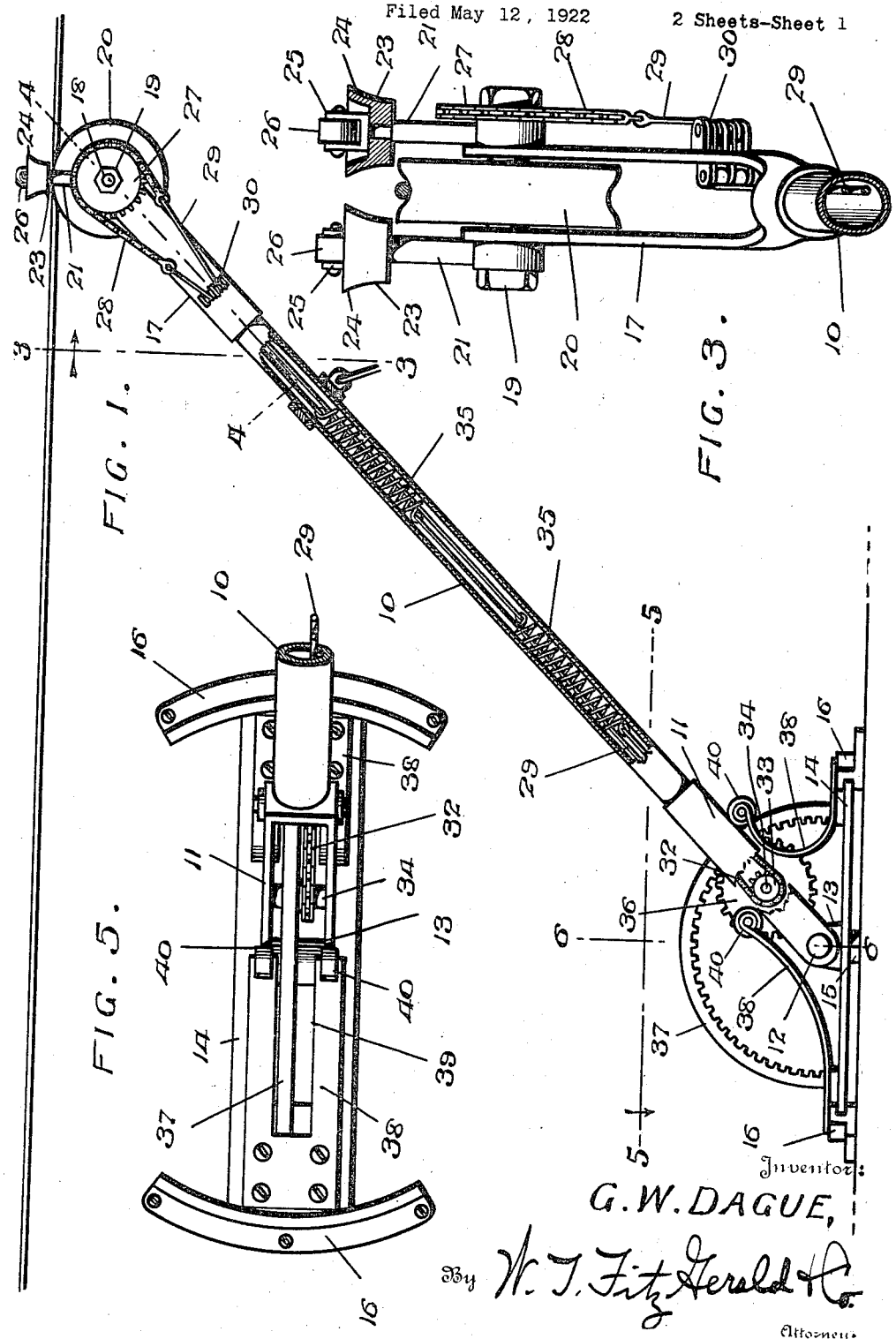

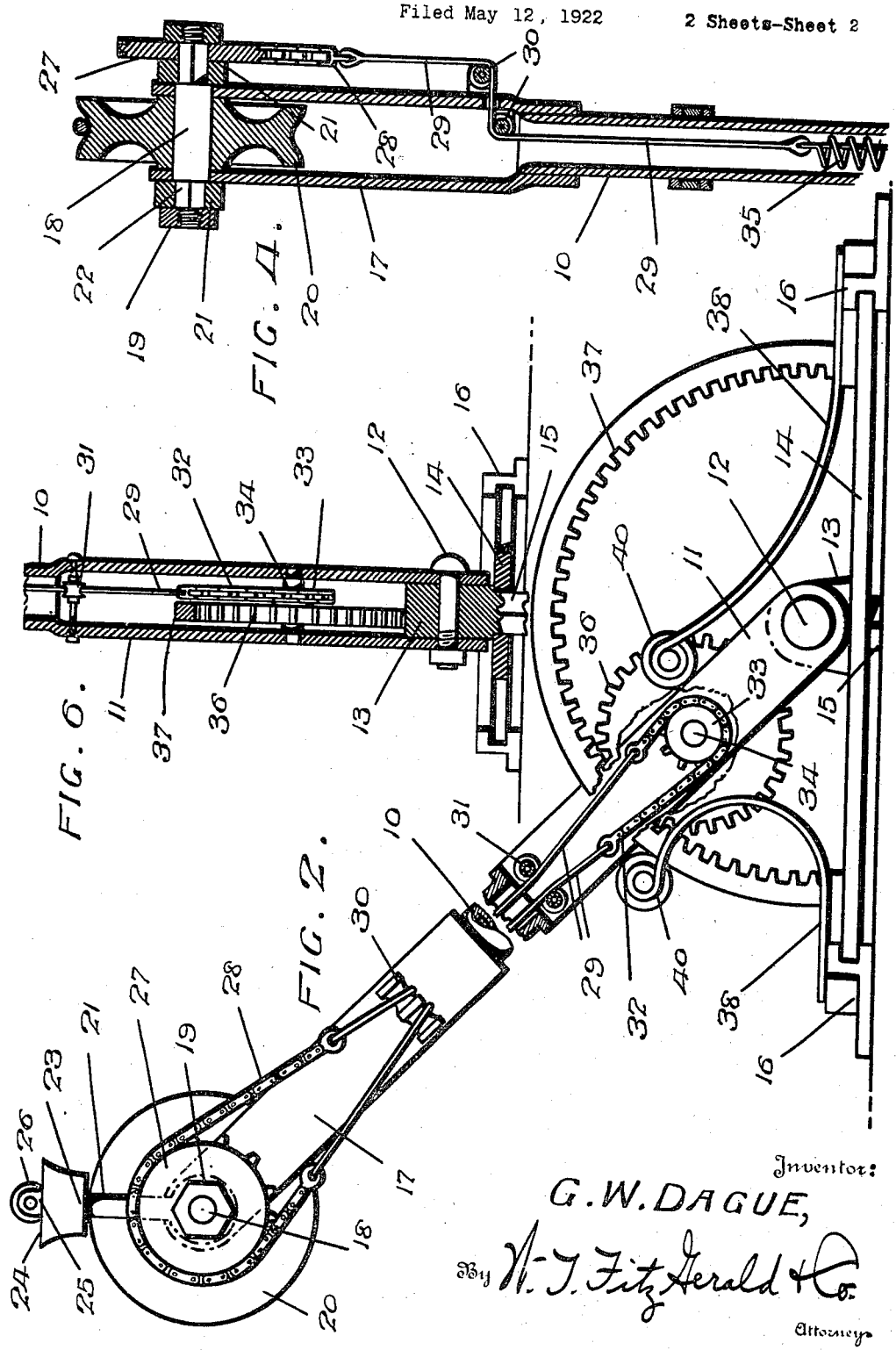

1,454,706

UNITED STATES PATENT OFFICE.

GEORGE W. DAGUE, OF OKLAHOMA, OKLAHOMA.

TROLLEY-POLE SAFETY DEVICE.

Application filed May 12, 1922. Serial No. 560,425.

*To all whom it may concern:*

Be it known that I, GEORGE W. DAGUE, a citizen of the United States, residing at Oklahoma city, in the county of Oklahoma and State of Oklahoma, have invented certain new and useful Improvements in Trolley-Pole Safety Devices; and I do hereby declare the following to be a full, clear, and exact description of the invention, such as will enable others skilled in the art to which it appertains to make and use the same.

The present invention relates to the trolley poles of electric railway cars, and aims to provide a novel and improved safety device for a trolley pole to prevent the trolley from jumping off the trolley wire.

Another object is the provision of upright guiding members at opposite sides of the trolley wheel, and novel means for mounting and controlling said members to maintain them in vertical or upright position in the different inclinations of the trolley pole.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a side elevation of a trolley pole embodying the improvements, portions being broken away and shown in section;

Fig. 2 is an enlarged elevation looking at the same side, with the trolley pole inclined in the opposite direction, portions being broken away and shown in section.

Fig. 3 is an enlarged section on the line 3—3 of Fig. 1, showing one of the side guard wheels in section.

Fig. 4 is an enlarged section on the line 4—4 of Fig. 1.

Fig. 5 is a section on the line 5—5 of Fig. 1, on an enlarged scale.

Fig. 6 is a vertical section on the line 6—6 of Fig. 1, on an enlarged scale, including a longitudinal section of the lower end portion of the trolley pole with the pole in vertical position.

The trolley pole proper, indicated at 10, is tubular, and has a fork 11 at its lower end pivoted, as at 12, on a bearing 13 mounted on a supporting plate 14 which turns with the trolley pole about a vertical pivot 15, to enable the trolley pole to follow the trolley wire when negotiating curves in the track. The ends of the plate 14 are movable in arcuate guides 16. The pivot 12 enables the trolley pole to swing upwardly and downwardly as usual, according to the distance of the trolley wire above the track.

The trolley pole 10 has a fork or harp 17 at its upper end in which a trolley wheel axle 18 is mounted, having the retaining nuts 19 screw-threaded on the protruding ends of the axle, and the trolley wheel 20 is mounted for rotation on said axle within the fork 17 to roll under the trolley wire in the usual manner. With the present invention, however, the groove of the trolley wheel can be made shallower than with the ordinary trolley wheels.

The guarding and guiding means for the trolley wheel comprise the opposite upstanding arms 21 at the sides of the trolley wheel having their lower ends fitted on angular portions 22 of the axle 18 between the fork 17 and nuts 19. Guard and guide wheels 23 are mounted for rotation on said arms with their adjacent portions above the flanges of the trolley wheel at the opposite sides of the trolley wire, and said wheels 23 have flared rims or flanges 24, which not only serve to prevent the trolley wheel from jumping off the trolley wire, but which also guide the upper end of the trolley pole in passing the trolley switches, the wheels 23 rolling along the opposite sides of the switch members or portions immediately above the trolley wire or between the adjacent ends of the trolley wire sections, as well known. The arms 21 have the forks 25 at their upper ends above the wheels 23 within the rims or flanges 24 thereof, in which forks are mounted rollers 26. Said rollers are rotatable about a transverse axis and project above the rollers 23 to roll under over-head plates of trolley switches, or the like.

In order to maintain the arms 21 substantially vertical in the different inclined positions of the trolley pole, a sprocket wheel 27 is fitted on one of the portions 22, so that the axle 18, arms 21 and sprocket wheel 27 turn as a unit. A sprocket chain 28 extends around said sprocket wheel, and its ends are secured to the upper ends of a pair of cables 29 which extend through the trolley pole 10. The fork 17 carries guide rollers 30 for the cables 29, and the lower fork 11 has suitable guide rollers 31 for said cables also. The lower ends of the cables 29 are secured to the opposite ends of a sprocket chain 32 which is looped around a sprocket wheel 33 mounted on an axle or shaft 34 mounted in the fork 11. Each of the cables 29 has an elastic coiled spring 35 disposed therein and located within the trolley pole 10, the two springs 35 being spaced apart longitudinally so as not to interfere. These springs 35 can stretch, when necessary, to enable the arms 21 to be swung downwardly, in either direction, should the rollers 23 or 26 strike obstructions, requiring the arms 21 to duck down. In this way, said arms can be swung down rearwardly, and one of the springs 35 will be stretched, so that as soon as the arms 21 have passed the obstruction, they will be returned to vertical position by the contraction of the corresponding spring.

The cables 29 are shifted longitudinally by the upward and downward swinging movement of the trolley pole. Thus, a gear pinion or wheel 36 is mounted on the axle 34 to rotate with the sprocket wheel 33, and said pinion 36 is disposed below and meshes with an arcuate rack 37 disposed above and having its ends secured on the plate 14. The fork 11 of the trolley pole is disposed astride said rack 37, and when the trolley pole is swung about the pivot 12, the pinion 36 rolls under the rack 37, thereby turning the sprocket wheel 33. The diameters of the wheels 27, 33 and 36 are such, that when the trolley pole is swung about the pivot 12, the arms 21 are swung relatively to the trolley pole, to maintain said arms vertical. Figs. 1 and 2 show the trolley pole swung to opposite inclined positions, with the arms 21 maintained in upright position.

Spring means are provided for swinging the trolley pole upwardly, in either inclined position, to keep the trolley wheel up against the trolley wire. Thus, opposite leaf springs 38 are secured on the guides 16 and project toward one another. Said springs are bifurcated, and have the slots 39 to accommodate the rack 37, and rollers 40 are mounted in the terminals of said springs to bear with a rolling contact against the edges of the arms of the fork 11. When the trolley pole is swung down in either direction to inclined position, the spring 38 toward which the trolley pole is swung, is bent back, to bring it under tension, whereby such spring tends to swing the trolley pole upwardly to vertical position. One spring or the other is thus brought under tension when the trolley pole is in inclined position, for holding the trolley wheel against the trolley wire under spring tension.

Having thus described the invention, what is claimed as new is:—

1. A trolley pole mounted for swinging movement to different inclined positions, a member relatively to which the pole is movable, upstanding guiding means carried by the upper end of the pole, and means for maintaining the guiding means in upstanding position in the different inclined positions of the pole operated by the movement of the pole relatively to said member.

2. A trolley pole mounted for swinging movement to different inclined positions, a member relatively to which the pole is movable, upstanding guiding means carried by the upper end of the pole, and means for maintaining the guiding means in upstanding position in the different inclined positions of the pole operated by the movement of the pole relatively to said member and including yieldable means permitting the guiding means to be swung downwardly when encountering an obstruction.

3. A trolley pole mounted for swinging movement to different inclined positions, a member relatively to which the pole is movable, an axle mounted in the upper end portion of the pole, a trolley wheel rotatable on the axle, upstanding guiding means carried by said axle, and means connected to the axle and having an operative relation between said pole and member for maintaining said guiding means in upstanding position in the different inclined positions of the pole.

4. A trolley pole mounted for swinging movement to different inclined positions, a trolley wheel mounted in the upper end portion of said pole, upstanding arms at the opposite sides of said wheel, guide rollers rotatable on said arms, and other guide rollers rotatably mounted on said arms above the aforesaid rollers, and rotatable about a transverse axis.

5. A trolley pole mounted for swinging movement to different inclined positions, a member relatively to which the pole is movable, an axle mounted in the upper end portion of said pole, a trolley wheel mounted on said axle, upstanding arms mounted on said axle at the opposite sides of said wheel, guide rollers mounted on said arms, and means connected to the axle and having an operative relation between said pole and member for maintaining said arms in upright position in the different inclined positions of the pole.

6. A trolley pole having a trolley wheel mounted in the upper end thereof, an upstanding arm at one side of said wheel, a guide wheel rotatable on said arm about the axist thereof and having an upwardly flared rim, and another guide roller mounted for rotation about a transverse axis in the upper end portion of said arm within said rim.

7. A trolley pole mounted for swinging movement to different inclined positions, upstanding guiding means carried by the upper end portion of the pole, an arcuate rack, a gear wheel carried by the pole in engagement with said rack, and an operative connection between said wheel and means to maintain said guiding means in upright position in the different inclined positions of the pole.

8. A trolley pole mounted for swinging movement to different inclined positions, upstanding guiding means carried by the upper end portion of the pole, an arcuate rack, a gear wheel carried by the pole in engagement with said rack, and an operative connection between said wheel and means to maintain said guiding means in upright position in the different inclined positions of the pole, said operative connection including yieldable means permitting the guiding means to be swung downwardly when striking an obstruction.

9. A trolley pole mounted for swinging movement to different inclined positions, an axle carried by the upper end portion of the pole, a trolley wheel rotatable on the axle, upstanding guiding means carried by the axle for keeping the trolley wheel against the trolley wire, an arcuate rack, a gear wheel carried by the pole and meshing with said rack, and an operative connection between said wheel and axle for maintaining the guiding means in upstanding position in the different inclined positions of the pole.

10. A trolley pole structure comprising a plate mounted for turning movement about a vertical axis, a tubular trolley pole pivotally connected with said plate to swing to different inclined positions, an axle mounted in the upper end portion of the pole, a trolley wheel rotatable on the axle, upstanding guiding means carried by the axle for keeping the trolley wheel against the trolley wire, an arcuate rack mounted on said plate, a gear wheel carried by the pole and meshing with said rack, and an operative connection between said wheel and axle including cables extending through the pole and having elastic spring portions.

In testimony whereof I have signed my name to this specification in the presence of two subscribing witnesses.

GEORGE W. DAGUE.

Witnesses:
C. R. HENDERSON,
F. G. CHANLAIN.